United States Patent [19]

Pechonis et al.

[11] Patent Number: 5,566,322
[45] Date of Patent: Oct. 15, 1996

[54] METHOD AND APPARATUS FOR PERFORMING READ ACCESSES FROM A COUNTER WHICH AVOID LARGE ROLLOVER ERROR WHEN MULTIPLE READ ACCESS CYCLES ARE USED

[75] Inventors: Daniel W. Pechonis; Joseph Jelemensky; Oded Yishay; John B. Waite, all of Austin, Tex.

[73] Assignee: Motorola Inc., Schaumburg, Ill.

[21] Appl. No.: 154,774

[22] Filed: Nov. 19, 1993

[51] Int. Cl.[6] .............................. G06F 13/14; G06M 3/12
[52] U.S. Cl. ...................... 395/481; 377/51; 364/DIG. 1; 364/942.7
[58] Field of Search .................................... 395/425, 481; 377/29, 51, 39; 364/770, 942.7

[56] References Cited

U.S. PATENT DOCUMENTS 4,679,194  7/1987  Peters et al. ............................... 371/16

Primary Examiner—David L. Robertson
Assistant Examiner—Kevin L. Ellis
Attorney, Agent, or Firm—Susan C. Hill

[57] ABSTRACT

Method and apparatus for performing read accesses from a counter (40) while avoiding the large rollover error that may occur when the counter (40) is read using more than one read access cycle. In one embodiment, the present invention monitors the most significant bit of the lower portion (44) of counter (40) for a transition indicating that a rollover has taken place. If a rollover has not occurred, read accesses take place in the normal manner. However, if a rollover has occurred during the latency period between a read access from the upper portion (42) of counter (40) and a corresponding read access from the lower portion (44) of counter (40), the read access from the lower portion (44) is inhibited and a default value is placed on the bus (36) instead.

24 Claims, 3 Drawing Sheets

METHOD AND APPARATUS FOR PERFORMING READ ACCESSES FROM A COUNTER WHICH AVOID LARGE ROLLOVER ERROR WHEN MULTIPLE READ ACCESS CYCLES ARE USED

FIELD OF THE INVENTION

The present invention relates in general to counter circuitry, and more particularly to a method and apparatus for performing read accesses from a counter.

BACKGROUND OF THE INVENTION

Microcomputer integrated circuits are used to control a wide variety of products ranging from a simple household appliance to a complex automobile. One of the important uses carried out by microcomputer integrated circuits is timing control. As an example, a household appliance may require a microcomputer timer to count how much time has elapsed between two events in order to control the appliance. In addition, a timer may be used as a real time clock or a stopwatch type clock to keep track of actual elapsed time.

Many prior art timers use one or more counter circuits which are incremented or decremented by an input signal. This input signal is commonly some type of clock signal. By using a clock signal to increment or decrement a counter, the counter is incremented or decremented at regular intervals.

However, a problem arises when the value of a counter must be read using more than one read access cycle. For example, if a counter is 32-bits wide and the bus used to transfer information during the read access to the counter is only 16-bits wide, the counter value must be read 16-bits at a time using two read access cycles. Unfortunately, however, the clock signal incrementing or decrementing the counter may increment or decrement the counter one or more times between the read access of the first portion of the counter and the read access of the second portion of the counter. During the latency period between the two read accesses, the counter continues to increment or decrement and may reach a "rollover" point before the second read takes place, causing a large error in the resulting value. Rollover is the point at which an up-counter reaches its maximum value (e.g. all 1's) and rolls over to its minimum value (e.g. all 0's), or a down-counter reaches its minimum value (e.g. all 0's) and rolls over to its maximum value (e.g. all 1's).

This large rollover error is a significant problem. Some prior art circuits solved this rollover error problem by adding a set of temporary latches which are capable of storing the portion of the counter which was not read during the first read access. The term "temporary" indicates that the latches temporarily store the unread counter portion value until the second read access occurs, at which time the value in the temporary latches is read.

As an example, if the 8-bit upper portion of a 16-bit down-counter is transferred across an 8-bit bus during a first read access, the corresponding 8-bit lower portion of the 16-bit down-counter is loaded and stored in a set of temporary latches. Thus the temporary latches are updated with the contents of the unread portion of the counter when the read of the upper portion of the counter takes place. The temporary latches store the corresponding 8-bit lower portion of the down-counter during the read latency period. Then the subsequent read access of the lower portion of the counter reads the value stored in the temporary latches, instead of the present value of the lower portion of the counter, which may have been incremented or decremented since the first read access. As a result, any counter activity during the read latency period between the first read access and the second read access, including counter rollover, has no effect on the composite value read from the various portions of the counter.

Unfortunately, implementation of temporary latches requires extra semiconductor area on an integrated circuit. A solution which avoids the large rollover error and which requires less semiconductor area is required.

SUMMARY OF THE INVENTION

The previously mentioned needs are fulfilled and other advantages achieved with the present invention. In one form, the present invention is a circuit having a bus, and having a counter coupled to the bus. The counter has a first counter portion storing a first counter portion value. The first counter portion is coupled to the bus. The counter has a second counter portion. The second counter portion has a most significant bit and stores a second counter portion value. The second counter portion is coupled to the bus and coupled to the first counter portion.

The circuit also has control circuitry for selectively providing the second counter portion value to the bus. The control circuitry has a first control signal and a second control signal. The control circuitry also has storage circuitry for receiving the first control signal and for storing a first value of the most significant bit of the second counter portion in response to the first control signal. In addition, the control circuitry has a circuit for receiving the second control signal and for providing the second counter portion value to the bus in response to the second control signal if the first value of the most significant bit of the second counter portion stored in the storage circuitry is a first logic state and if the most significant bit of the second counter portion stored in the second counter portion is the first logic state. The circuit for receiving the second control signal is coupled to the storage circuitry.

In another form, the present invention is a method for performing read accesses from a counter in a data processing system. The data processing system has a bus coupled to the counter. The counter has an upper portion storing an upper counter value and a lower portion storing a lower counter value. The upper counter value has a most significant bit. The bus has a first bit width. The counter has a second bit width. The second bit width is greater than the first bit width. The method includes the step of initiating a read access from the counter. The read access has a third bit width. The third bit width is greater than the first bit width.

The method also includes the step of providing the upper counter value from the upper portion of the counter to the bus. The method includes the step of transferring the upper counter value on the bus. The method includes the step of storing the most significant bit of the lower counter value in a storage element. If the most significant bit of the lower counter value stored in the storage element has a first logic state, and if the most significant bit of the lower counter value in the lower portion of the counter has a second logic state, the method includes the step of transferring a predetermined value on the bus.

The present invention will be understood by one skilled in the art from the detailed description below in conjunction with the accompanying drawings.

DESCRIPTION OF THE PREFERRED EMBODIMENT

The present invention provides a method and apparatus which avoids the large rollover error that may occur when two or more portions of a counter are read using more than one read access cycle. In addition, the present invention requires significantly less semiconductor area than the prior art approach which uses a full set of temporary latches.

In one embodiment, the present invention monitors the most significant bit (MSB) of the lower portion of the counter for a transition indicating that a rollover has taken place. If a rollover has not occurred during the latency period between a read access from the upper portion of the counter and a corresponding read access from the lower portion of the counter, read accesses take place in the normal prior art manner. However, if a rollover has occurred during this same latency period, the read access from the lower portion of the counter is inhibited and a default value is placed on the bus instead. The default value is a value which occurred in the lower portion of the counter during the above-described latency period.

For example, if the counter was an up-counter which rolled over from all 1's to all 0's, the default value driven on the bus may be all 1's. In some embodiments of the present invention, a precharged bus having a precharged value of all 1's may be used. Thus if rollover occurred, inhibiting transfer of the lower counter value from the lower portion of the counter to the bus during the read access causes the default value of all 1's to be transferred across the bus. Thus the circuitry which initiated the read of the counter receives an entire counter value which is guaranteed to not have a large rollover error.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. The symbol "%" preceding a number indicates that the number is represented in its binary or base two form. The symbol "$" preceding a number indicates that the number is represented in its hexadecimal or base sixteen form.

Figure 1:
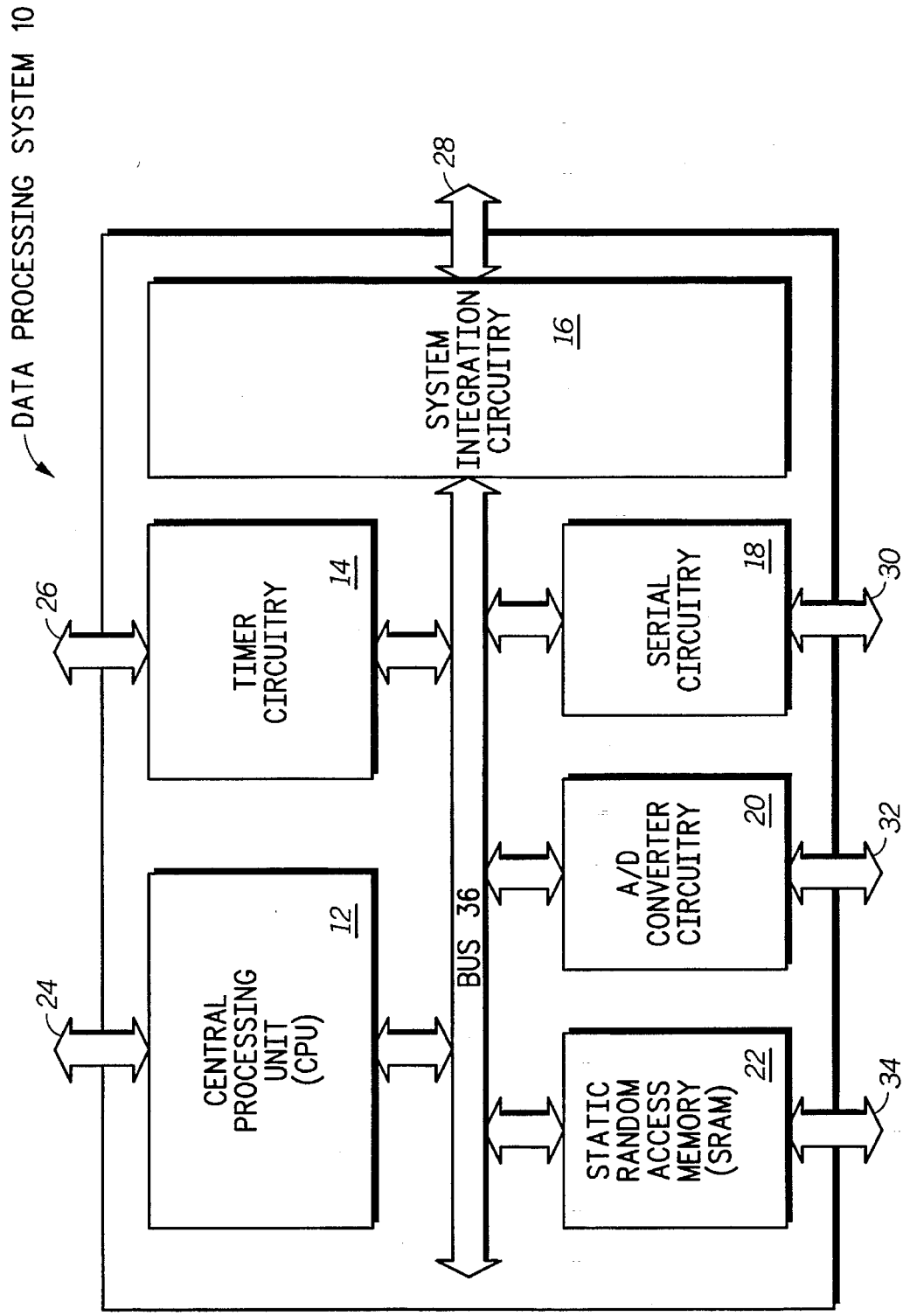
FIG. 1 illustrates, in block diagram form, a data processing system 10 in accordance with one embodiment of the present invention.

The present invention can be more fully understood with reference to FIGS. 1–4. FIG. 1 illustrates a data processing system 10 that includes a central processing unit (CPU) 12, timer circuitry 14, system integration circuitry 16, serial circuitry 18, A/D converter circuitry 20, static random access memory (SRAM) 22, which are all bi-directionally coupled to bus 36. CPU 12 is optionally coupled external to data processing system 10 by way of integrated circuit terminals 24. Timer 14 is coupled external to data processing system 10 by way of integrated circuit terminals 26.

System integration circuitry 16 is coupled external to data processing system 10 by way of integrated circuit terminals 28. Serial circuitry 18 is coupled external to data processing system 10 by way of integrated circuit terminals 30. A/D converter circuitry 20 is coupled external to data processing system 10 by way of integrated circuit terminals 32. SRAM 22 is optionally coupled external to data processing system 10 by way of one or more integrated circuit terminals 34. In one embodiment, data processing system 10 is a microcomputer formed on a single integrated circuit. In one embodiment of the present invention, integrated circuit terminals 24, 26, 28, 30, 32, and 34 are integrated circuit bonding pads. In another embodiment of the present invention, integrated circuit terminals 24, 26, 28, 30, 32, and 34 are integrated circuit pins.

Figure 2:
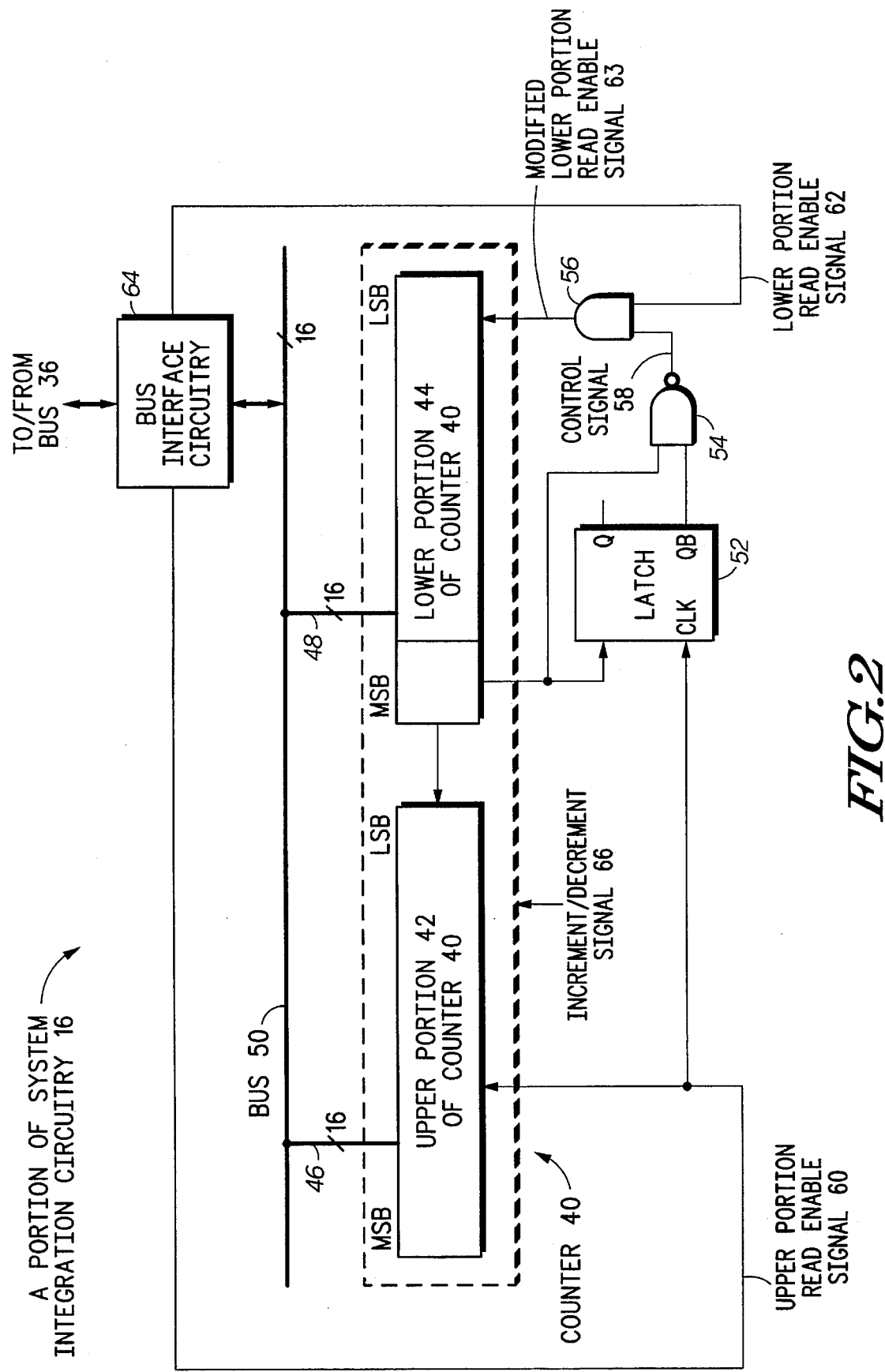
FIG. 2 illustrates, in partial block diagram form and partial schematic diagram form, a portion of system integration circuitry 16 of FIG. 1 in accordance with one embodiment of the present invention.

FIG. 2 illustrates a portion of system integration circuitry 16. The illustrated portion of system integration circuitry 16 includes counter 40, which is coupled to bus 50 by way of conductors 46 and 48. In an alternate embodiment of the present invention, counter 40 may be coupled directly to bus 50. Bus 50 is bi-directionally coupled to bus interface circuitry 64. Bus interface circuitry 64 is bi-directionally coupled to bus 36. In one embodiment of the present invention, bus 36 and bus 50 are 16-bits wide, and conductors 46 and conductors 48 are 16-bits wide. In alternate embodiments of the present invention, these busses and conductors may be any width.

Counter 40 has an upper portion 42 and a lower portion 44. Lower portion 44 is coupled to upper portion 42. Upper portion 42 receives an upper portion read enable signal 60, and lower portion 44 receives a modified lower portion read enable signal 63. In one embodiment of the present invention, upper portion 42 is 16-bits wide, and lower portion 44 is also 16-bits wide. In alternate embodiments of the present invention, upper portion 42 may be any width and lower portion 44 may be any width. Counter 40 receives an increment/decrement signal 66 which causes counter 40 to be incremented if counter 40 is an up-counter, and which causes counter 40 to be decremented if counter 40 is a down-counter. Note that counter 40 may be implemented using a variety of circuits, including prior art circuits which are known to one of ordinary skill in the art. Also, bus interface circuitry 64 may be implemented using prior art circuits which are known to one of ordinary skill in the art.

Latch 52 has a clock input coupled to receive the upper portion read enable signal 60. Latch 52 also has a data input for receiving the most significant bit (MSB) of the lower portion 44 of counter 40. Latch 52 has an inverted output "QB" which is coupled to a first input of NAND-gate 54. A second input of NAND-gate 54 is coupled to receive the most significant bit (MSB) of the lower portion 44. The output of NAND-gate 54 provides control signal 58 and is coupled to a first input of AND-gate 56. A second input of AND-gate 56 receives a lower portion read enable signal 62. The output of AND-gate 56 is coupled to lower portion 44 of counter 40.

When a 32-bit read access of counter 40 is initiated, for example by central processing unit (CPU) 12, the 32-bit read access is partitioned into two 16-bit read accesses. In one embodiment of the present invention, the first 16-bit read access is to the upper portion 42 of counter 40, and the second 16-bit read access is to the lower portion 44 of counter 40. Bus interface circuitry 64 initiates the first 16-bit read access by asserting the upper portion read enable signal 60. When the upper portion read enable signal 60 is asserted, the value in the upper portion 42 of counter 40 is provided from the upper portion 42 to the bus 50 by way of conductors 46. The value from the upper portion 42 is then transferred to bus 36 by way of bus interface circuitry 64. The value from the upper portion 42 is then transferred to CPU 12 by way of bus 36. This 16-bit read access of the upper portion 42 of counter 40 occurs in the same manner as a prior art read access.

However, unlike the prior art, the assertion of the upper portion read enable signal 60 also causes latch 52 to be clocked, thus latching and storing the value contained in the most significant bit (MSB) of lower portion 44 of counter 40. It is important to note that the most significant bit (MSB) of lower portion 44 which is stored in latch 52, and the value in the upper portion 42 which is provided to the bus 50, both correspond to a same point in time which will be called T1. The same control signal, namely upper portion read enable signal 60, causes the counter 40 to provide the value in the upper portion 42 to conductors 46 and to provide the value of the most significant bit (MSB) of lower portion 44 to latch 52. Note that no increment or decrement of counter 40 can occur between the time that the value in the upper portion 42 is provided to conductors 46 and the time that the value of the most significant bit (MSB) of lower portion 44 is provided to latch 52.

After this 16-bit read access of the upper portion 42, and before the assertion of the lower portion read enable signal 62, there is a latency period during which counter 40 may be incremented or decremented one or more times. The value of the most significant bit (MSB) of lower portion 44 at time T1 is stored in latch 52. The current value of the most significant bit (MSB) of lower portion 44 is stored in lower portion 44. The complemented state of the most significant bit (MSB) at T1 and the current value of the most significant bit (MSB) are both inputs to circuit element 54.

In one embodiment of the present invention, counter 40 is a down-counter and circuit element 54 is a NAND-gate. If the most significant bit (MSB) of lower portion 44 changes from a logic state zero to a logic state one during the latency period (indicating lower portion 44 has rolled over from all 0's to all 1's), the inputs to NAND-gate 54 will both be 1's. As a result, the output of NAND-gate 54, namely control signal 58, will be a logic state zero.

In an alternate embodiment of the present invention (not shown), counter 40 is an up-counter and circuit element 54 is an OR-gate. If the most significant bit (MSB) of lower portion 44 changes from a logic state one to a logic state zero during the latency period (indicating lower portion 44 has rolled over from all 1's to all 0's), the inputs to the OR-gate will both be 0's. As a result, the output of the OR-gate, namely control signal 58, will be a logic state zero.

At the end of the latency period, bus interface circuitry 64 initiates the second 16-bit read access by asserting the lower portion read enable signal 62. The assertion of the lower portion read enable signal 62 causes the control signal 58 to be transferred directly to the lower portion 44 of counter 40.

If control signal 58 is a logic state one (indicating no rollover condition occurred), then the output of AND-gate 56, namely the modified lower portion read enable signal 63, will be asserted. When the modified lower portion read enable signal 63 is asserted, the value in the lower portion 44 of counter 40 is provided from the lower portion 44 to the bus 50 by way of conductors 48. The value from the lower portion 44 is then transferred to bus 36 by way of bus interface circuitry 64. The value from the lower portion 44 is then transferred to bus CPU 12 by way of bus 36. Except for the manner in which the modified lower portion read enable signal 63 is generated and the manner in which a default value is provided to bus 50, this 16-bit read access of the lower portion 44 of counter 40 occurs in the same manner as a prior art read access.

If control signal 58 is a logic state zero (indicating a rollover condition has occurred), then the output of AND-gate 56, namely the modified lower portion read enable signal 63, will not be asserted. As a result, although bus interface circuitry 64 has initiated the second 16-bit read access by asserting the lower portion read enable signal 62, circuit elements 54 and 56 effectively inhibit the read access of lower portion 44. If the modified lower portion read enable signal 63 is negated, lower portion 44 is inhibited from providing the current value stored in the lower portion 44 to bus 50 by way of conductors 48. Instead of providing the value stored in lower portion 44 to bus 50, a default value is provided to bus 50.

In some embodiments of the present invention, the default value is transferred to bus 36 by way of bus interface circuitry 64. In alternate embodiments of the present invention, the default value is merely the precharged state of bus 36 where modified lower portion read enable signal 63 inhibits any circuitry which may cause one or more bus signals of bus 36 to be discharged from the precharged state.

Various embodiments of the present invention will now be discussed. In alternate embodiments of the present invention, counter 40 may be an up-counter or a down-counter, busses 36 and 50 may be high-true or low-true busses, and busses 36 and 50 may be precharged or non-precharged busses. For example, if counter 40 is a down-counter and bus 50 is a high-true bus, the default value on bus 50 will be all zeros. And if counter 40 is an up-counter and bus 50 is a high-true bus, the default value on bus 50 will be all ones.

In the embodiment of the present invention illustrated in FIG. 2, counter 40 is a down-counter, and bus 50 is precharged to all 1's and is low-true. In this case, inhibiting the read of lower portion 44 will leave bus 50 precharged to all 1's.

Similarly, in another embodiment of the present invention, counter 40 is an up-counter, and bus 50 is precharged to all 1's and is high-true. In this case, inhibiting the read of lower portion 44 will leave bus 50 precharged to all 1's.

In two other embodiments of the present invention, counter 40 is an up-counter, and bus 50 is low-true and is either precharged to all 1's or non-precharged. In these cases, the combination of a negated control signal 58 and an asserted lower portion read enable signal 62 are used to enable a series of pull-down devices (not shown) to place all 0's on bus 50.

In a fifth embodiment of the present invention, counter 40 is an up-counter, and bus 50 is high-true and is non-precharged. In this case, the combination of a negated control signal 58 and an asserted lower portion read enable signal 62 are used to enable a series of pull-up devices (not shown) to place all 1's on bus 50.

In two more embodiments of the present invention, counter 40 is a down-counter, and bus 50 is high-true and is either precharged to all 1's or non-precharged. In these cases, the combination of a negated control signal 58 and an asserted lower portion read enable signal 62 are used to enable a series of pull-down devices (not shown) to place all 0's on bus 50.

In yet another embodiment of the present invention, counter 40 is a down-counter, and bus 50 is low-true and is non-precharged. In this case, the combination of a negated control signal 58 and an asserted lower portion read enable signal 62 are used to enable a series of pull-up devices (not shown) to place all 1's on bus 50.

Note that for the embodiment of the present invention illustrated in FIG. 2, the most significant bit of upper portion 42 of counter 40 is the most significant weighted bit of the entire counter value stored in both upper portion 42 and lower portion 44.

Figure 4:
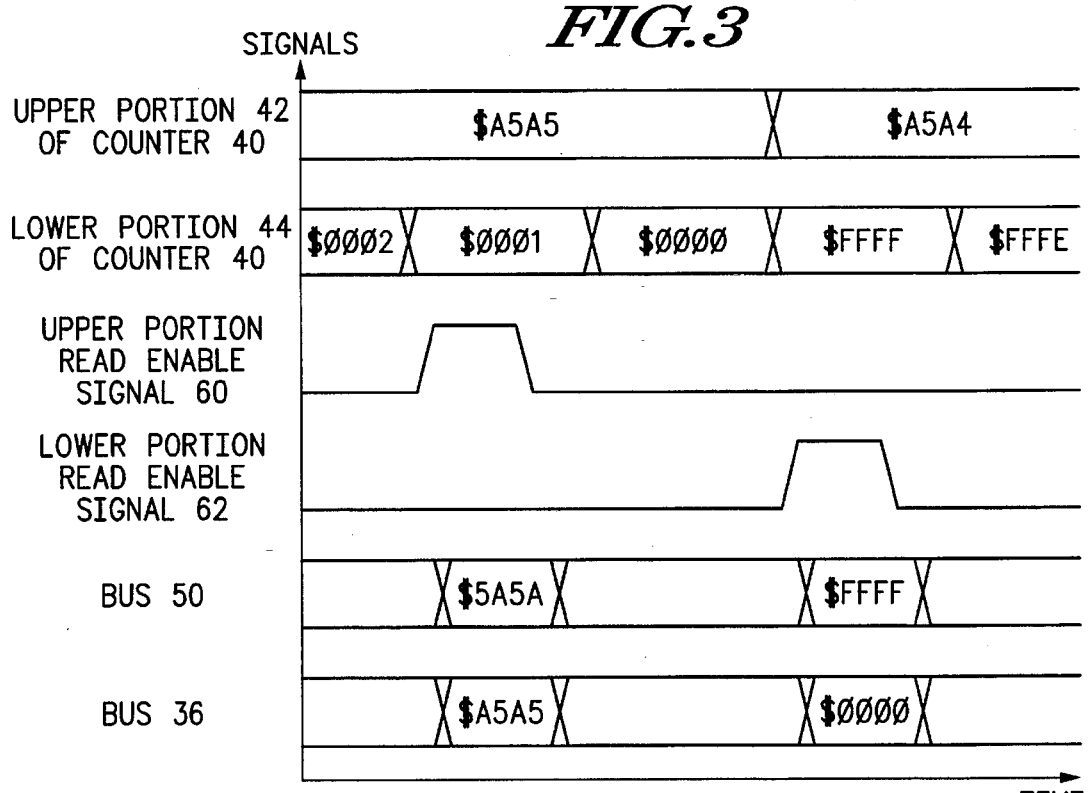
FIG. 4 illustrates, in timing diagram form, how a large rollover error is avoided when a plurality of read accesses are used to read a counter value in accordance with one embodiment of the present invention.

FIG. 4 illustrates a timing diagram of one embodiment of data processing system 10 of FIG. 1. In this embodiment, counter 40 is a down-counter, the 16-bit wide bus 50 is precharged to all 1's and is low-true, bus 36 is high-true, and counter 40 is 32-bits wide. The read latency period is the time period between the assertion of the upper portion read enable signal 60 and the assertion of the lower portion read enable signal 62. During the read latency period, the lower portion 42 of counter 40 counts down to $0000 and rolls over from $0000 to $FFFF. As a result of the rollover, the upper portion of the counter is decremented by one, from $A5A5 to $A5A4. Although the value stored in the upper portion 42 of counter 40 is $A5A5, the assertion of the upper portion read enable signal 60 transfers the complement of $A5A5, namely $5A5A, to the low-true bus 50.

Due to the rollover of counter 40, the control signal 58 remains negated. Because the control signal 58 remains negated, the modified lower portion read enable signal 63 remains negated even though the lower portion read enable signal 62 is asserted. Because the modified lower portion read enable signal 63 remains negated, lower portion 44 is inhibited from transferring the value in the lower portion 44 to bus 50. Instead, low-true bus 50 is left at its precharged state of $FFFF.

As a result of the two 16-bit read accesses, the 32-bit counter value provided to high-true bus 36 by way of bus interface circuitry 64 is $A5A50000. It is important to note that the counter value $A5A50000 represents a value that occurred in the counter 40 during the read latency period.

Figure 3:
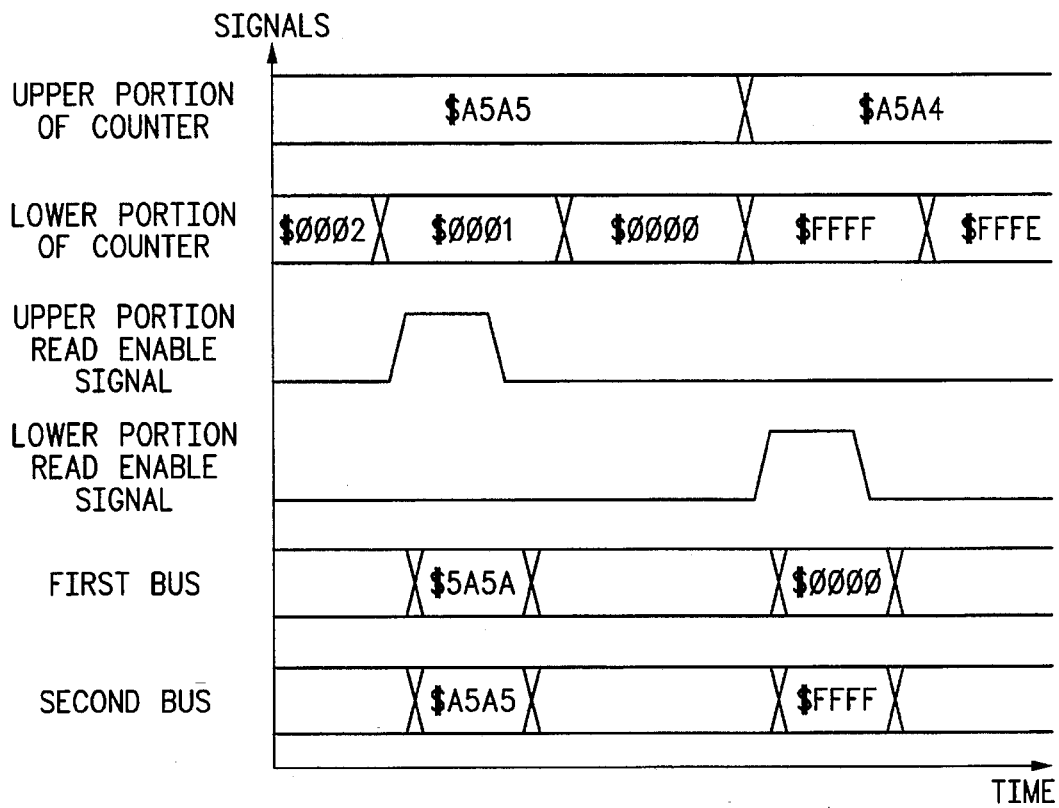
FIG. 3 illustrates, in timing diagram form, a large rollover error which can result when a plurality of read accesses are used to read a counter value.

FIG. 3 illustrates a timing diagram of a data processing system which does not use the present invention. For example, FIG. 3 illustrates the behavior of the circuitry in FIG. 2 if circuit elements 52, 54, and 56 were removed, and if the lower portion read enable signal 62 was input directly into lower portion 44 in the same manner as upper read enable signal 60 is input to upper portion 42.

In the data processing system illustrated in FIG. 3, counter 40 is a down-counter, the 16 bit wide bus 50 (first bus) is precharged to all 1's and is low-true, bus 36 (second bus) is high-true, and counter 40 is 32-bits wide. The read latency period is the time period between the assertion of the upper portion read enable signal and the assertion of the lower portion read enable signal. During the read latency period, the lower portion 42 of counter 40 counts down to $0000 and rolls over from $0000 to $FFFF. As a result of the rollover, the upper portion of the counter is decremented by one, from $A5A5 to $A5A4.

Although the value stored in the upper portion of the counter is $A5A5, the assertion of the upper portion read enable signal transfers the complement of $A5A5, namely $5A5A, to the low-true first bus. Although the value stored in the lower portion of the counter is now the rollover value $FFFF, the assertion of the lower portion read enable signal transfers the complement of $FFFF, namely $0000 to the low-true first bus.

Because a rollover of the lower portion of the counter took place during the read latency period, the 32-bit counter value provided to high-true bus 36 by way of bus interface circuitry 64 is $A5A5FFFF. This represents a large rollover error of up to 65,535 (decimal) counts from the correct value of $A5A50000. Note that the vast majority of times that the counter is read using a 32-bit read access, the counter will not rollover. However, many applications which use a counter will not function properly if a large rollover error can occur, even though the large rollover error occurs infrequently. For example, if the counter is being used to count real time and the read accesses are used to update the digital display of a digital watch, a large rollover error may cause the watch to occasionally display an inaccurate time.

While the present invention has been illustrated and described with reference to specific embodiments, further modifications and improvements will occur to those skilled in the art. For example, in alternate embodiments of the present invention, data processing system 10 may be any type of data processing system which includes a counter 40. For example, data processing system 10 may be a timer data processing system or a serial data processing system. Or data processing system 10 may be a microcomputer integrated circuit which has a counter 40 that is read accessible across bus 36, but which has different blocks of circuitry than those illustrated in FIG. 1. In addition, in alternate embodiments of the present invention, counter 40 may not be included as part of system integration circuitry 16, but may be located anywhere in data processing system 10.

In alternate embodiments of the present invention, the most significant bit (MSB) of the lower portion 44 of counter 40 may be stored in any type of storage element which is capable of storing a digital value. Latch 52 is merely one example of such a storage element. Note that if the storage element does not have an inverted output such as "QB", the non-inverted output of the storage element may be provided to the input of an inverter (not shown). The output of the inverter (not shown) may then be provided to the first input of NAND-gate 54.

In yet other embodiments of the present invention, circuit elements 54 and 56 may be replaced with different circuit elements which serve the function of comparing the present MSB value with the stored MSB value, and in response to the outcome of the comparison, inhibiting or allowing the value stored in lower portion 44 to be provided to bus 50. If the comparison shows that a rollover has not occurred, the value stored in lower portion 44 is provided to bus 50. And if the comparison shows that a rollover has occurred, the value stored in lower portion 44 is not provided to bus 50.

In alternate embodiments of the present invention, any type of circuitry may be used to provide the default value to bus 50.

Note that in alternate embodiments of the present invention, the maximum value of the counter may be any value, not necessarily all ones. Likewise, the minimum value of the counter may be any value, not necessarily all zeros.

The present invention may also be extended to the case where more than two read accesses are required to transfer the entire counter value. For example, if counter 40 in FIG. 2 was 48-bits wide and bus 50 was 16-bits wide, three read accesses would be required to transfer the entire counter value. In this case, the most significant bit (MSB) of both the lower portion and the middle portion of counter 40 must be checked in order to detect if a rollover from that portion has occurred during the read latency period. If a rollover has occurred for the middle portion of counter 40, the default value will be supplied to bus 50 instead of the actual counter value for both the read access to the middle portion and the read access to the lower portion of counter 40. And if a rollover has occurred for only the lower portion of counter 40, the default value will be supplied to bus 50 instead of the actual counter value for the read access to the lower portion of counter 40.

It is to be understood, therefore, that this invention is not limited to the particular forms illustrated and that the appended claims cover all modifications that do not depart from the spirit and scope of this invention.

We claim:

1. A circuit, comprising:

a bus;

a counter, coupled to said bus; and a control circuit;

wherein said counter comprises:

a first counter portion storing a first counter portion value, said first counter portion being coupled to said bus; and a second counter portion having a most significant bit and storing a second counter portion value, said second counter portion being coupled to said bus and to said first counter portion; and wherein said control circuit comprises:

a first control signal;

a second control signal;

storage means for receiving said first control signal and for storing a first value of the most significant bit of said second counter portion in response to said first control signal; and circuit means for receiving said second control signal and for causing the second counter portion value to be provided to said bus in response to said second control signal if the first value of the most significant bit of said second counter portion stored in said storage means is a first logic state and if the most significant bit of said second counter portion stored in said second counter portion is the first logic state, said circuit means being coupled to said storage means.

2. A circuit as in claim 1, wherein said circuit means causes the first counter portion value to be provided to said bus in response to said first control signal.

3. A circuit as in claim 1, wherein said first control signal is asserted during a read access to said counter, and wherein said second control signal is asserted during the read access to said counter.

4. A circuit as in claim 3, wherein said counter has a first bit width and said bus has a second bit width, and wherein the first bit width is greater than the second bit width.

5. A circuit as in claim 4, wherein said first counter portion has the second bit width and said second counter portion has the second bit width.

6. A circuit as in claim 1, wherein said storage means comprises:

a latch for storing the first value of the most significant bit of said second counter portion.

7. A circuit as in claim 1, further comprising:

a central processing unit, coupled to said bus.

8. A circuit as in claim 1, wherein said circuit means inhibits providing the second counter portion value to said bus in response to said second control signal if the first value of the most significant bit of said second counter portion stored in said storage means is the first logic state and if the most significant bit of said second counter portion stored in said second counter portion is a second logic state.

9. A circuit as in claim 8, wherein said circuit means causes the second counter portion value to be provided to said bus in response to said second control signal if the first value of the most significant bit of said second counter portion stored in said storage means is the second logic state and if the most significant bit of said second counter portion stored in said second counter portion is the first logic state.

10. A data processing system, comprising:

counter circuitry; and a bus, coupled to said counter circuitry;

wherein said counter circuitry further comprises:

a first read enable signal;

a second read enable signal;

a counter, said counter having a first counter portion and a second counter portion, the second counter portion having a most significant bit, the first counter portion receiving said first read enable signal, the first counter portion providing a first counter portion value to said bus in response to assertion of said first read enable signal, the first counter portion being coupled to the second counter portion; and a control circuit, coupled to the second counter portion, said control circuit receiving said first read enable signal and receiving said second read enable signal, in response to assertion of said first read enable signal said control circuit storing the most significant bit of the second counter portion as a stored most significant bit of the second counter portion; and wherein if the stored most significant bit of the second counter portion has a first logic state during a predetermined time period, and the most significant bit of the second counter portion has a second logic state during the predetermined time period, then said control circuit inhibits the second counter portion from providing a second counter portion value to said bus in response to assertion of said second read enable signal.

11. A data processing system as in claim 10, further comprising:

a central processing unit, coupled to said bus.

12. A data processing system as in claim 10, wherein said first read enable signal and said second read enable signal are asserted during a read access to said counter.

13. A method for performing read accesses from a counter in a data processing system, the data processing system having a bus coupled to the counter, the counter having an upper portion storing an upper counter value and a lower portion storing a lower counter value, the lower counter value having a most significant bit, the bus having a first bit width, the counter having a second bit width, wherein the second bit width is greater than the first bit width, the method comprising the steps of:

initiating a read access from the counter;

providing the upper counter value from the upper portion of the counter to the bus;

transferring the upper counter value on the bus;

storing the most significant bit of the lower counter value in a storage element; and if the most significant bit of the lower counter value stored in the storage element has a first logic state during a predetermined period of time, and if the most significant bit of the lower counter value in the lower portion of the counter has a second logic state during the predetermined period of time, transferring a predetermined value on the bus.

14. A method as in claim 13, further comprising the step of:

if the most significant bit of the lower counter value stored in the storage element has the first logic state during the predetermined period of time, and if the most significant bit of the lower counter value in the lower portion of the counter has the second logic state during the predetermined period of time, inhibiting transfer of the lower counter value from the lower portion of the counter to the bus during the read access from the counter.

15. A method as in claim 13, further comprising the step of:

performing one of an increment operation and a decrement operation on the counter.

16. A method as in claim 15, wherein execution of said step of providing the upper counter value from the upper portion of the counter to the bus and execution of said step of storing the most significant bit of the lower counter value in a storage element are completed before execution of said step of performing one of an increment operation and a decrement operation is begun.

17. A method as in claim 13, wherein the counter is a down counter.

18. A method as in claim 17, wherein the first logic state is a logic state zero and the second logic state is a logic state one.

19. A method as in claim 13, wherein the predetermined value is a precharged value.

20. A method as in claim 19, wherein the precharged value is all ones.

21. An integrated circuit, comprising:

a bus;

a counter comprising a first counter portion and a second counter portion, the first counter portion storing a first counter portion value, the second counter portion storing a second counter portion value, the counter being coupled to said bus;

a storage circuit which receives and stores a most significant bit of the second counter portion value in response to a read access of the first counter portion, said storage circuit being coupled to said second counter portion; and a control circuit which selectively inhibits providing the second counter portion value to said bus in response to a read access of the second counter portion, said control circuit being coupled to said storage circuit.

22. A circuit as in claim 21, further comprising:

a central processing unit, coupled to said bus.

23. A circuit as in claim 21, wherein a predetermined value is provided on said bus during the read access of the second counter portion when said control circuit selectively inhibits providing the second counter portion value to said bus.

24. A method as in claim 23, wherein the predetermined value is a precharged value.

* * * * *